United States Patent [19]

Grube

[11] 4,206,850
[45] Jun. 10, 1980

[54] COUPLING DEVICE FOR MONORAIL VEHICLES

[75] Inventor: Erwin Grube, Bielefeld, Fed. Rep. of Germany

[73] Assignee: Dürkoppwerke GmbH, Bielefeld, Fed. Rep. of Germany

[21] Appl. No.: 888,788

[22] Filed: Mar. 21, 1978

[30] Foreign Application Priority Data

Mar. 22, 1977 [DE] Fed. Rep. of Germany ....... 7708906

[51] Int. Cl.² ........................... B61G 1/00; B61B 3/00
[52] U.S. Cl. .................................. 213/175; 16/87 R; 104/93; 105/150; 104/172 S
[58] Field of Search ................. 104/93, 110, 1 A, 112, 104/172 S, 89, 106, 94; 105/156, 150; 213/75 TC, 88, 105, 101, 175; 16/93 R, 94 R, 87 R; 46/216; 295/1

[56] References Cited

U.S. PATENT DOCUMENTS

| 142,815 | 9/1873 | Replogle ............................ 213/175 |
| 497,044 | 5/1893 | Baken ................................ 213/175 |
| 3,028,455 | 4/1962 | Devonshire ......................... 104/94 |
| 3,724,387 | 4/1973 | Civitarese .......................... 104/93 |
| 3,739,424 | 6/1973 | Gonsalves .......................... 104/93 |

FOREIGN PATENT DOCUMENTS

| 356808 | 1/1921 | Fed. Rep. of Germany ............ 46/216 |
| 946651 | 12/1948 | France ..................................... 46/216 |

*Primary Examiner*—Trygve M. Blix
*Assistant Examiner*—Frank F. Atwood
*Attorney, Agent, or Firm*—Karl F. Ross

[57] ABSTRACT

In a monorail system in which a carriage is displaceable along a track and is adapted to be connected to or released from load carriers or the like, a coupling device is provided which comprises a hook swingably mounted on the axis of one of the supporting rollers of a carriage or carrier and adapted to engage a portion of the roller dolly of the other vehicle above the rail.

5 Claims, 4 Drawing Figures

COUPLING DEVICE FOR MONORAIL VEHICLES

CROSS-REFERENCE TO RELATED APPLICATION

This application is related to my concurrently filed, commonly assigned copending application Ser. No. 888,787, now abandoned entitled MOTORIZED MONORAIL FOR GOODS AND THE LIKE.

FIELD OF THE INVENTION

The present invention relates to a coupling device for monorail vehicles and, more particularly, to a device enabling the interconnection of monorail vehicles together for joint movement along a monorail track but decouplable to permit separate movement of the vehicles.

BACKGROUND OF THE INVENTION

Monorail vehicles and systems are used for a variety of purposes and have become considerable importance in the goods-handling field.

For example, an endless main stretch of a monorail track may be provided in a factory, storage or distribution center and can have a large number of spurs leading to and away from the main track. These spurs may run to processing, manufacturing, treatment or storage stations and it is desirable to provide vehicles which permit goods to be carried from one station to another, i.e. from one spur onto the main stretch and then onto another spur.

A typical monorail vehicle for this purpose can be a rack from which the goods can be suspended, i.e. having a bar from which garments can be supported by hangers of conventional design.

Frequently it is necessary or desirable to connect several vehicles of this type together, i.e. to couple two or more racks into a train for joint displacement of the racks. It is also desirable to permit a motorized vehicle or tractor displaceable along the track to be coupled to a goods-carrying vehicle so as to enable the same to be displaced from one station to another.

The invention is principally concerned with coupling devices for this purpose.

Monorail vehicles frequently are provided with rollers which ride along the upper surface of the rail and have arms, brackets or suspenders hanging down from these rollers to support the load. In the case of a motorized vehicle, this load can be the tractor housing and body and can include an electric motor, a battery for powering same if the motor is not driven by electric current, picked up from a rail paralelling the track, and one or more drive wheels connected to the roller and frictionally or otherwise engaging the track.

The wheel means supporting the tractor or other vehicles upon the monorail track can be described as a dolly or bogie and generally comprises a support to which the hanger or suspender is attached and on which one or more wheels are journaled.

Conventional coupling devices for the purposes described are usually fixed, i.e. one or more vehicles can be connected together upon assembly of the system and then cannot be decoupled or detached from one another without time-consuming operations. Furthermore, systems which allow coupling and decoupling and known in the art have invariably been extremely complex and/or difficult to manipulate or operate.

OBJECTS OF THE INVENTION

It is the principal object of the present invention to provide an improved coupling device for a monorail system of the type described.

Another object of the invention is to provide a low-cost, reliable, easily manipulated and self-coupling mechanism for a monorail vehicle which avoids the disadvantages of earlier systems.

SUMMARY OF THE INVENTION

These objects and others which will become more readily apparent hereinafter are attained, in accordance with the present invention, in a suspension assembly for a monorail vehicle which comprises a support having a hanger or suspender carrying the body of the vehicle and in which a wheel riding on the monorail track is journaled for rotation about an axis which is usually horizontal. According to the invention, a coupling hook is swingable on this axis and is adapted to project beyond the support into engagement with the support of another vehicle while the support itself is formed as a strap bent into an eye configuration and connected on opposite sides to the shaft or axle of the wheel. A similar support on another vehicle is provided and the bend of the strap can thus form an eye in which the hook can engage.

According to a feature of the invention, the hook assembly comprises a U-shaped bent sheet-metal member or stirrup whose bight is connected to a bent finger forming the actual engaging portion of the hook, the stirrup being swingably mounted upon the axle of the wheel. More particularly, the wheel axle can be formed by a bolt spanning the opposite sides of the support strap and carrying an inner bearing race for the wheel, this race being axially extended to each side of the wheel so as to form a sleeve upon the opposite axial ends of which the arms of the stirrup are mounted to enable the swinging movement described.

One of the arms of the stirrup is provided with a laterally extending tongue which projects outwardly beyond a respective side of the strap and forms an abutment limiting the swinging movement of the stirrup in one direction while enabling manual displacement of the stirrup in the opposite direction to disengage the hook finger from the eye of the other vehicle. This tongue projects through a cutout in the support.

According to yet another feature of the invention, the support is bent from a single length of strap steel or iron and is provided on opposite sides with bores through which the bolt passes. In the regions of these bores, the strap is bent with outwardly open recesses, one of which can accommodate a nut while the other receives the suspender or hanger through which the bolt can also pass. The outwardly open recesses are thus formed by inwardly projecting bends.

Spring means is connected between the stirrup and the strap and can be a leaf or blade spring or a tension spring. The spring means can facilitate return of the stirrup to its engaging position. Alternatively or in addition, the spring means can act as a cushion for the stirrup when it is swung out of engagement with another vehicle and can provide a detent for yieldably retaining the stirrup and hook in an inactive position.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
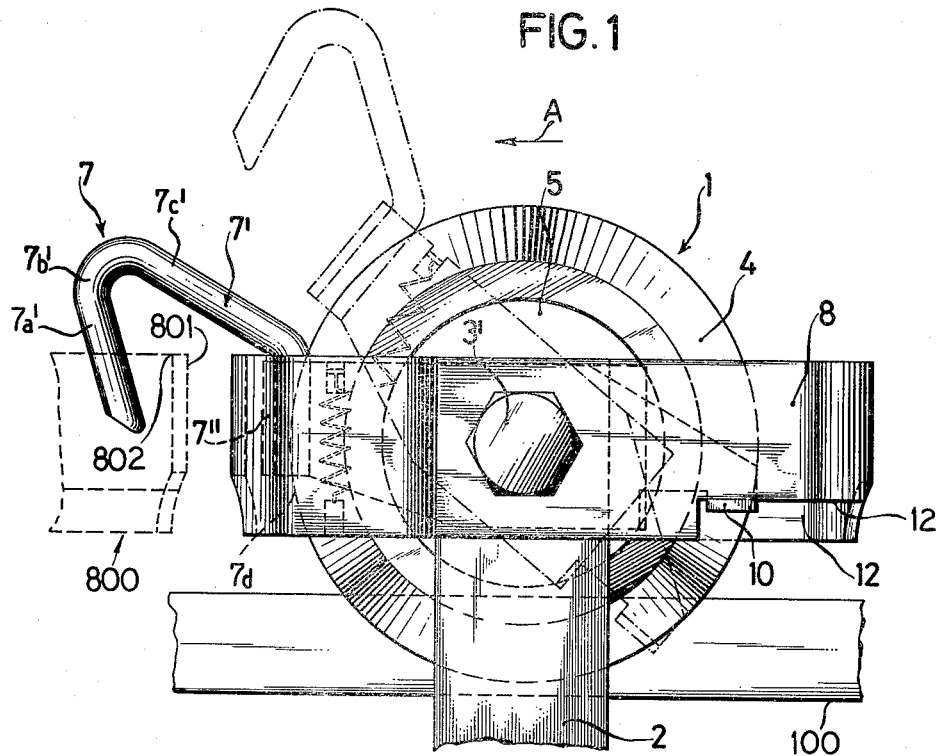
FIG. 1 is a side-elevational view of a coupling device for a tractor or like motorized vehicle of a monorail system according to the invention.
Figure 2:
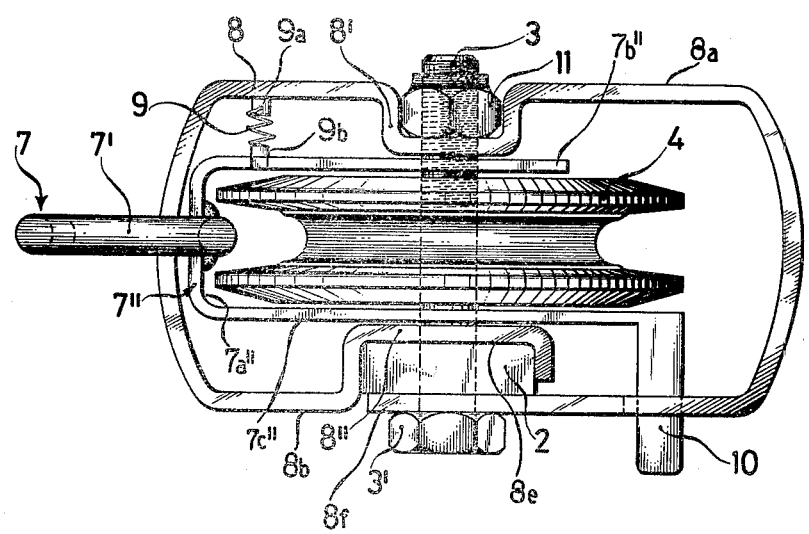
FIG. 2 is a plan view thereof.
Figure 3:
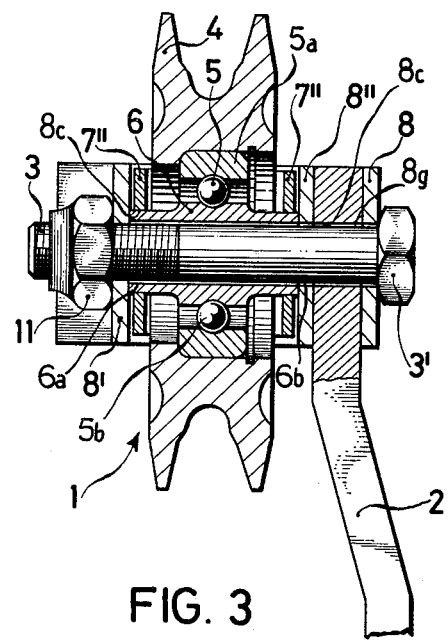
FIG. 3 is a cross-sectional view taken along a plane of the bolt axis in FIG. 2.

The coupling device shown in FIGS. 1–3 comprises a roller assembly or dolly 1 from which a vehicle is suspended from a monorail track as described, for example, in the aforementioned copending application. The assembly 1 thus comprises a downwardly extending arm 2 which may support all or part of a tow bar pivotally connected to a tractor for the monorail system. This tow bar can be pivotally connected to the hanger 2 and can be coupled by the device to be described in detail below to a goods carrier on a spur track. Thus, when the tractor is positioned along the main track and then backed or reversed to cause the wheel unit 1 to ride along the spur, the unit 1 can engage a goods carrier from the spur and enable it to be drawn with the tractor along the main stretch of track. In other words, the tractor can be displaced only upon the main stretch and need not itself ride along any spur although it can, via the tow bar and wheel arrangement 1, be used to pick up and deliver goods carriers between spurs. The vehicle travels in the direction of arrow A.

Alternatively, the wheel unit 1 may be the support assembly for a goods carrier which can be, for example, a rack upon which garments can be hung by the usual hangers.

The arm 2 forms part of a support for the roller body or wheel 4 of the assembly 1, this wheel having a profile which is complementary to that of the monorail track, the latter being represented at 100 in FIG. 1.

As can be seen from FIG. 3, the wheel 4 is press-fitting onto a bearing 5 which can include an outer bearing race 5a, roller bodies 5b and an inner bearing race 6 which is laterally extended at 6a and 6b to form a sleeve axially surrounding a bolt 3 upon which the wheel 4 is journaled. The inner race 6 can be rotatable upon or fixed to the bolt 3 although it is preferred to simply slip the race 6 on this bolt.

The coupling device of the present invention comprises a hook assembly generally represented at 7 and an eye arrangement of another vehicle which has been represented at 8 for the assembly 1 in question. It should be understood that the hook assembly 7 can engage the eye arrangement 8 of another vehicle as shown for the assembly 800 in dot-dash lines in FIG. 1. The coupling eye 8 is provided as a sheet-iron or steel strap which is bent into the configuration shown best in FIG. 2.

The hook assembly 7 comprises a finger 7′ having a downwardly but inwardly inclined end 7a′ connected by a bend 7b′ to the upwardly extending shank 7c′ which has a downwardly turned end 7d (FIG. 1) welded to the bight of a stirrup 7″ (see FIG. 2).

Because of this configuration of the finger 7′, a movement of the assembly 1 in the direction of arrow A will cause the finger 7′ to ride up upon the side 801 of the eye 800 and then grip over the edge 802 thereof.

The stirrup 7″ of the assembly has the aforementioned bight 7a″ and arms 7b″ 7c″, the latter being provided with throughgoing bores and riding, as has been shown in FIG. 3, upon the outer ends of the sleeve portions 6a and 6b of the inner race. A lateral extension 10 of the arm 7c″ passes through a cutout in the strap 8.

A tension spring 9 anchored at 9a to the strap 8 and at 9b to the stirrup 7″ returns the stirrup to its solid line position shown, the tongue 10 abutting the edge 12a of the strap 8 in this position. Using the tongue 10, the stirrup 7″ can be swung in the clockwise direction (FIG. 1) by hand to lift the hook out of engagement with the vehicle to which it had previously been coupled.

The strap 8 is, as previously noted, bent from a single length of steel or iron and is formed into the generally rectangular, rounded-end profile evident in FIG. 2. This structure has sides 8a and 8b which are formed respectively with inwardly bent, outwardly open recess portions 8′ and 8″ respectively.

The recess formed by the inwardly bent portion 8′ snugly receives a nut 11 so as to prevent rotation thereof, this selflocking nut being threaded onto the bolt 3 which passes through a bore 8c of the stirrup.

The bolt also passes through a bore 8d in the side 8″ of the strap within the recess 8e formed by the inwardly bent portion 8″, this recess snugly receiving the rectangular-section bar which forms the hanger or suspender 2. An end 8f of the strap is likewise provided with a bore 8g through which the bolt passes so that the bar 2 is clamped between member 8b and 8f of the strap, the head 3′ of the bolt bearing against member 8f. This arrangement is best seen from FIG. 3. The sides 8a and 8b of the strap rest against the axial ends of the sleeve portion 6a and 6b of the inner race.

Figure 4:
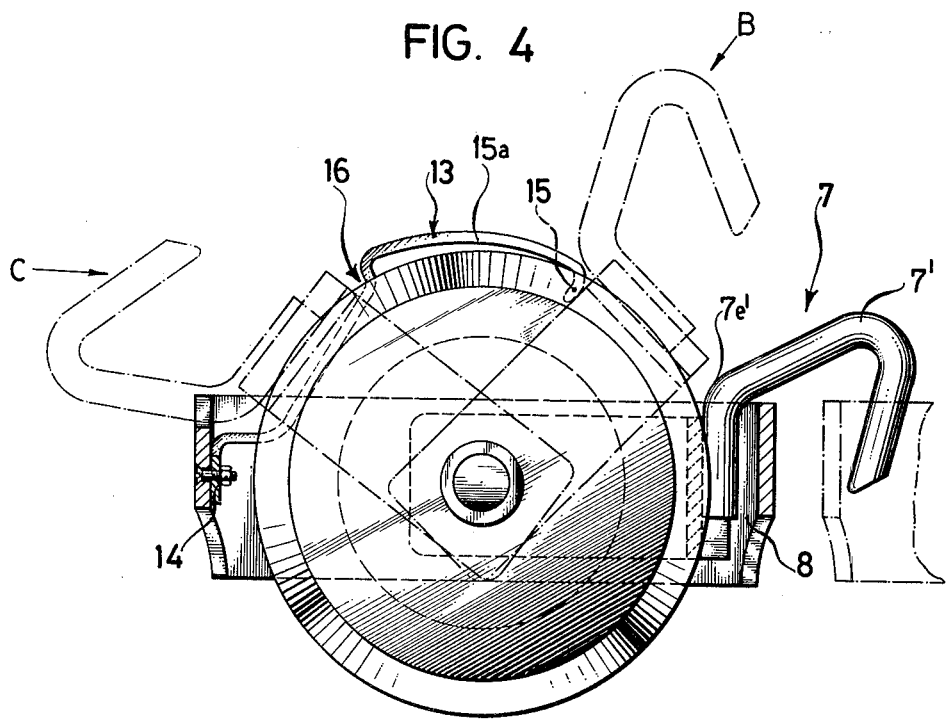
FIG. 4 is a side-elevational view, partly broken away, of another embodiment of the invention.

In the embodiment of FIG. 4, a leaf or bent wire spring 13 is provided, this spring being connected at 14 by a screw to the end of the eye 8 remote from the hook portion 7. The spring defines a cushioning end 15 which is turned inwardly and is engageable yieldably by the bend 7e′ of the hook finger 7′. Thus, upon the upward clockwise movement of the hook assembly at the dot-dash line position B shown in FIG. 4, the end 15 yieldably retards (i.e. cushions) the movement.

When, however, it is desired to maintain the hook assembly in a disengaged position, it can be forced over the arcuate stretch 15a of the spring 13 behind a detent 16 thereof (dot-dash position C in FIG. 4) so that automatic coupling will not occur. The detent arrangement retains the hook assembly in the position shown at C in spite of acceleration and deceleration of the vehicle without vibration.

In order to render the coupling device of FIG. 4 effective, it is merely necessary to force the hook addembly 7 over the detent 16 and the spring 13 into the solid line position shown.

I claim:

1. In a monorail system having a plurality of vehicles with respective wheel assemblies enabling the displacement of the vehicle along a monorail track, the improvement which comprises a coupling device for releasably connecting two such assemblies together, said coupling device comprising:

a generally rectangular support having a pair of longitudinal lateral sides extending in the direction of said track and a pair of opposite ends, said support being formed from a bent-metal strap;

a bolt passing through said lateral sides and spanning such support;

an elongated tubular inner bearing race surrounding said bolt between said lateral sides;

a wheel journaled on said inner bearing race and having an outer bearing race and a row of roller bodies engaging said inner bearing race;

a generally U-shaped stirrup received between said lateral sides and having a pair of arms extending from a bight, said stirrup being bent from metal strap and said arms flanking said wheel and being swingable on said inner bearing race between said wheel and a respective lateral side of said support;

a bent-rod hook affixed to said bight and swingable with said stirrup to hook over the support of another wheel assembly, one of said lateral sides being formed with a cutout and a corresponding one of said arms being formed with a laterally extending tongue projecting from said cutout and enabling said stirrup to be swung to disengage said hook from said other support.

2. The improvement defined in claim 1 wherein one of said lateral sides is bent to form an outwardly open recess so accommodating a unit threaded into said bolt, the opposite lateral side being formed with two ends of the metal strap from which the support is formed and receiving a hanger from which a body is suspended.

3. The improvement defined in claim 1, further comprising a spring connecting said stirrup with one of said lateral sides and biasing said hook into engagement with the other support.

4. The improvement defined in claim 1, further comprising a bent spring detent connected to the support carrying said stirrup and lying in the path of said hook upon the angular displacement thereof out of engagement with the other support and along which the stirrup can ride.

5. The improvement defined in claim 1 wherein said finger has a downwardly and inwardly turned portion enabling said finger to ride up and over said other support.

* * * * *